(12) United States Patent
Stenqvist et al.

(10) Patent No.: US 11,970,962 B2
(45) Date of Patent: Apr. 30, 2024

(54) ADAPTION OF A UREA DEPOSIT MODEL VALUE

(71) Applicant: VOLVO TRUCK CORPORATION, Gothenburg (SE)

(72) Inventors: Dan Stenqvist, Västra Frölunda (SE); Murtaza Khambaty, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/319,724

(22) Filed: May 18, 2023

(65) Prior Publication Data

US 2023/0374927 A1 Nov. 23, 2023

(30) Foreign Application Priority Data

May 20, 2022 (EP) .................................... 22174483

(51) Int. Cl.
*F01N 3/20* (2006.01)

(52) U.S. Cl.
CPC .......... *F01N 3/208* (2013.01); *F01N 2610/02* (2013.01); *F01N 2610/105* (2013.01); *F01N 2900/0408* (2013.01); *F01N 2900/1402* (2013.01); *F01N 2900/1621* (2013.01); *F01N 2900/18* (2013.01)

(58) Field of Classification Search
CPC ................. F01N 3/208; F01N 2610/02; F01N 2610/105; F01N 2900/0408; F01N 2900/1402; F01N 2900/1621; F01N 2900/18; F01N 3/2006; F01N 2560/021; F01N 2560/026; F01N 2900/1602; Y02A 50/20

See application file for complete search history.

(56) References Cited

U.S. PATENT DOCUMENTS

| | | | |
|---|---|---|---|
| 2009/0056310 A1 | 3/2009 | Xu et al. | |
| 2013/0192206 A1 | 8/2013 | Keghelian et al. | |
| 2019/0063289 A1* | 2/2019 | Yi | ...................... B01D 53/9431 |

FOREIGN PATENT DOCUMENTS

| | | |
|---|---|---|
| GB | 2448993 A | 11/2008 |
| WO | 2020205112 A1 | 10/2020 |

OTHER PUBLICATIONS

Extended European Search Report in corresponding European Application No. 22174483.2 dated Sep. 28, 2022 (8 pages).

* cited by examiner

*Primary Examiner* — Brandon D Lee

(74) *Attorney, Agent, or Firm* — Venable LLP; Jeffri A. Kaminski

(57) ABSTRACT

A method for adapting a urea deposit build up model used for estimating an amount of urea deposits in an aftertreatment system of a vehicle including a catalytic reduction device is provided.

14 Claims, 4 Drawing Sheets

ADAPTION OF A UREA DEPOSIT MODEL VALUE

TECHNICAL FIELD

The present disclosure relates to a method for adapting a urea deposit build up model used for estimating an amount of urea deposits in an aftertreatment system of a vehicle. The present disclosure also relates to a corresponding exhaust aftertreatment system, a vehicle, a computer program, and a control unit. Although the method and system will be described in relation to a vehicle in the form of a truck, the method and system can also be efficiently incorporated in other vehicle types such as busses, light-weight trucks, passenger cars, construction equipment, marine vessels, and industrial equipment.

BACKGROUND

For a diesel engine a catalytic unit such as a selective catalytic reduction device is often used together with a urea dosing system for reducing the emission of hazardous nitrogen oxides such as NO and NO2. More specifically, urea pyrolysis and HNCO hydrolysis converts urea to ammonia, NH3. Ammonia then reacts with hazardous NO and NO2 to produce harmless N2 and H2O inside the selective catalytic reduction device.

However, an unavoidable bi-reaction that occurs causes urea deposits to form on different surfaces and of the catalytic unit. The urea deposits may for example include biuret, triuret, melamine, ammeline, ammelide and cyanuric acid, and typically get stuck on metal surfaces and build up deposits or crystals. In severe cases, an exhaust pipe may be close to completely clogged by such deposits.

In order to avoid, or at least reduce the risk of urea deposits to build up in the exhaust aftertreatment system of vehicles, a urea deposit model is used for triggering regeneration to remove deposits.

However, there are uncertainties about how urea deposit/crystals are built up which lead to inaccurate urea deposit models. This leads to that regeneration may not be trigged when needed or that it will be trigged when not needed.

Accordingly, there is a need for better adapting the models so that more precise regeneration can triggered.

SUMMARY

An object of the invention is to provide a method and system for adapting a urea deposit build up model used for estimating an amount of urea deposits in an aftertreatment system of a vehicle comprising a catalytic reduction device that at least partly alleviates the deficiencies with the prior art.

According to the first aspect of the invention, there is provided a method for adapting a urea deposit build up model used for estimating an amount of urea deposits in an aftertreatment system of a vehicle comprising a catalytic reduction device, the method comprising the steps of: determining an amount of ammonia present in the catalytic reduction device; heating the catalytic reduction device to above a threshold temperature to sublime urea deposits in the catalytic reduction device to thereby produce ammonia that adds to the determined amount of ammonia; maintaining the temperature at or above the threshold temperature for time duration until a measured amount of outflow of NOx is stable thereby indicating that the NOx conversion has stopped; calculating, for the time duration, an accumulated difference between an inflow level of NOx and the outflow level of NOx to obtain a total amount of converted NOx during the time duration; if the determined amount of ammonia exceeds an ammonia threshold, adjusting the total converted amount of NOx according to the determined amount of ammonia and a predetermined relationship between converted NOx and used ammonia; calculating the amount of urea deposits that were present in the aftertreatment system before the time duration using the calculated total amount of converted NOx, a predetermined relationship between converted NOx and used ammonia, and a predetermined relationship between the amount urea deposits and used ammonia, and adapting a urea deposit build up model so that an output value of the urea deposit build up model more closely corresponds to the calculated amount of urea deposits.

The present invention is based on the realization that the amount of urea deposits can be estimated by analysing the total converted NOx during a heating period at a temperature exceeding the subliming temperature of urea deposits. When urea deposits sublime, they release ammonia that reacts with the NOx. By isolating the amount of NOx converted by the released ammonia during the associated time duration of subliming the urea deposits, i.e., subliming all the urea deposits as is confirmed by that the NOx out level is not changing, it is possible to relate the total converted NOx to the released ammonia and therefore also to the amount or urea deposits that were sublimed, using known relationships. The inventors especially realized to use the calculated amount of urea deposits for adapting the urea deposit build up model to more accurately, or correctly, estimate the amount of urea deposits.

Thus, by the provision of the herein proposed method, urea deposit regeneration can be more accurately performed only when it is needed, the more the urea deposit build up model is updated. Improving the regeneration frequency may further lead to improved fuel consumption.

That urea deposits are sublimed may also be termed "decomposed" and means that the solid urea deposits are vaporized or "melted".

The term "NOx" refer to nitrogen oxides.

NOx sensors are commonly used in exhaust gas aftertreatment systems of vehicles and are configured to detect and measure the levels of nitrogen oxides in the exhaust gas. NOx sensors are considered known per se and details about their operation and functionality will not be described in detail herein.

The engine of the vehicle is preferably an internal combustion engine. The internal combustion engine may be diesel engine or a gasoline engine or any other type of internal combustion engine. The internal combustion engine may be part of a hybrid driveline partly powered by a battery.

A catalytic reduction device is generally a device able to reduce the level of nitrogen oxides in exhaust aftertreatment systems of vehicles. Various types of catalytic reduction devices are per se known and are conceivable options for embodiments of the present invention, and some examples are selective catalytic reduction devices, lean nitrogen oxide traps, hydrogen-carbon selective catalytic reduction devices and a selective catalytic reduction-coated diesel particulate filter.

The level of nitrogen oxides may be defined in different ways and is not limited as such. For example, the level of nitrogen oxides may be a relative amount, e.g. a ppm of the total amount of exhaust gas flow, or the level of nitrogen oxides may be nitrogen oxide flow, e.g. measured as mass/unit time, for example, gram/second.

The predetermined relationship between converted NOx and used ammonia and the predetermined relationship between the amount urea deposits and used ammonia may be ratios between the corresponding entities.

According to an example embodiment, the step of determining the amount of ammonia may comprise heating the catalytic reduction device to above a lower threshold temperature below a subliming temperature of urea deposits to substantially empty the catalytic device from ammonia, so that the determined amount of ammonia is below the ammonia threshold. This, way, the step of determining the amount of ammonia is reduced or replaced to making sure that the amount of ammonia is near zero by heating of the catalytic reduction device. That the determined amount of ammonia is below the ammonia threshold means that the amount of ammonia is near or at zero in the catalytic reduction device.

According to an example embodiment, the method may comprise maintaining the temperature at or above the lower threshold temperature for time duration until the inflow level of NOx to the aftertreatment system is equal to an out-flow level of NOx from the aftertreatment system. This comparison is an indication that no ammonia is present in the catalytic reduction device since in such case no NOx conversion can take place. During this time duration, no additional urea is preferably injected to the aftertreatment system. The lower threshold temperature may be about 250° C.

The above procedure is one possible way of determining the amount of urea present in the aftertreatment system, by making sure the ammonia buffer is empty. However, other ways are envisaged.

For example, according to an example embodiment, the step of determining the amount of ammonia may comprise using an ammonia buffer model for calculating the present amount of ammonia in the catalytic reduction device. The ammonia buffer model is typically used for tracking the amount of ammonia in the catalytic reduction device. Ammonia buffer models are per se known and generally takes urea flow, engine out NOx and temperature as input, and calculates or models the amount (absolute or relative) of ammonia resulting from the injected urea that reacts with NOx for conversion and the amount (absolute or relative) of ammonia that is adsorbed on the surface of the catalytic reduction device. Through mass balance calculations, the amount of ammonia being adsorbed in the catalytic reduction device can be continuously calculated.

Preferably, no urea is injection during the heating duration to sublime urea deposits. However, as outlined below, this is possible in some embodiments.

Thus, according to an example embodiment, the method may comprise: injecting urea to the catalytic reduction device while heating the catalytic reduction device to above the threshold temperature for subliming urea deposits, using closed loop feedback control so that all the injected ammonia is used for NOx conversion, and, calculating the amount of ammonia transferred from sublimed urea deposits as the difference between the total ammonia needed for total conversion of NOx and the injected amount of ammonia, wherein the amount of urea deposits is calculated using the calculated amount of ammonia transferred from sublimed urea deposits and the predetermined relationship between the amount urea deposits and used ammonia. In other words, if a controlled feedback loop is used it may be possible to inject urea during the subliming time duration.

According to an example embodiment, the threshold temperature to sublime urea deposits is about 350° C.

According to the second aspect of the invention, there is provided an exhaust aftertreatment system of a vehicle characterized by: a catalytic reduction device; a first NOx sensor upstream of the catalytic reduction device for measuring inflow levels of NOx, and a second NOx sensor downstream of the catalytic reduction device for measuring outflow levels of NOx; means for heating the catalytic reduction device; a memory storage device, and a control unit configured to: determine an amount of ammonia present in the catalytic reduction device; control the means to heat the catalytic reduction device to above a threshold temperature to sublime urea deposits in the catalytic reduction device to thereby produce ammonia that adds to the determined amount of ammonia; control the means to maintaining the temperature at or above the threshold temperature for time duration until a measured amount of outflow of NOx is stable thereby indicating that the NOx conversion has stopped; calculate, for the time duration, an accumulated difference between an inflow amount of NOx measured by the first NOx sensor and the outflow amount of NOx measured by the second NOx sensor to obtain total converted NOx during the time duration; if the determined amount of ammonia exceeds an ammonia threshold, adjust the total amount of converted NoX according to the determined amount of ammonia and a predetermined relationship between converted NOx and used ammonia; calculate the amount of urea deposits that were present in the aftertreatment system before the time duration using the calculated total amount of converted NOx, a predetermined relationship between converted NOx and used ammonia, and a predetermined relationship between the amount urea deposits and used ammonia, and adapt a urea deposit build up model so that an output value of the urea deposit build up model more closely corresponds to the calculated amount of urea deposits, and store the adapted urea deposit build up model in the memory storage device.

According to an example embodiment, the control unit may be configured to: apply the adapted urea deposit build up model for estimating urea deposit build up during operation of the vehicle. Thus, once the urea deposit build up model is adapted to the actual measured value, the urea deposit build up model is deployed for usage in the field.

According to an example embodiment, the means for heating may include at least one of: performing a regeneration process, increasing vehicle engine load and speed, increasing a pressure across the catalytic reduction device, inject extra diesel upstream of a diesel oxidation catalyst (DOC). Accordingly, many options are available and suitable for providing heating of the catalytic reduction device.

According to an example embodiment, the control unit may be configured to receive a trigger signal for initiating the steps for adapting the urea deposit build up model, the trigger signal being caused by a controller external to the vehicle. The trigger signal may be caused by an operator at a workshop. The vehicle control system may receive a fault code that turns out to be erroneous, for example erroneously indicating there is deposit build up, or indicating some other fault that turns out to be caused by non-detected urea deposit build up.

Effects and features of the second aspect of the invention are largely analogous to those described above in connection with the first aspect.

According to a third aspect of the invention, there is provided a vehicle comprising the exhaust aftertreatment system according to the second aspect.

According to a fourth aspect of the invention, there is provided a computer program comprising program code means for performing the steps of the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided a control unit for adapting a urea deposit build up model used for estimating an amount of urea deposits in an aftertreatment system of a vehicle comprising a catalytic reduction device, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
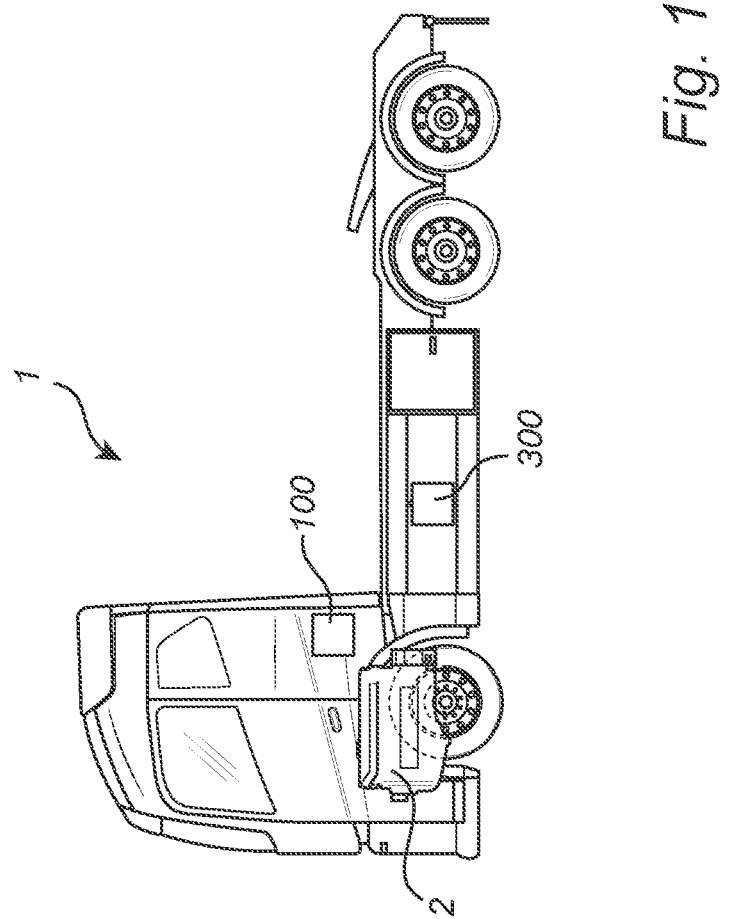
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of a truck 1 comprising an engine 2 such as or example an internal combustion engine. The truck 1 further comprises a control unit 100 and an exhaust gas aftertreatment system 300 including catalytic devices such as selective catalytic reduction units. Further, exhaust gas aftertreatment system 300 includes e.g. urea injectors, particulate filters, and nitride oxide sensors.

Figure 2:
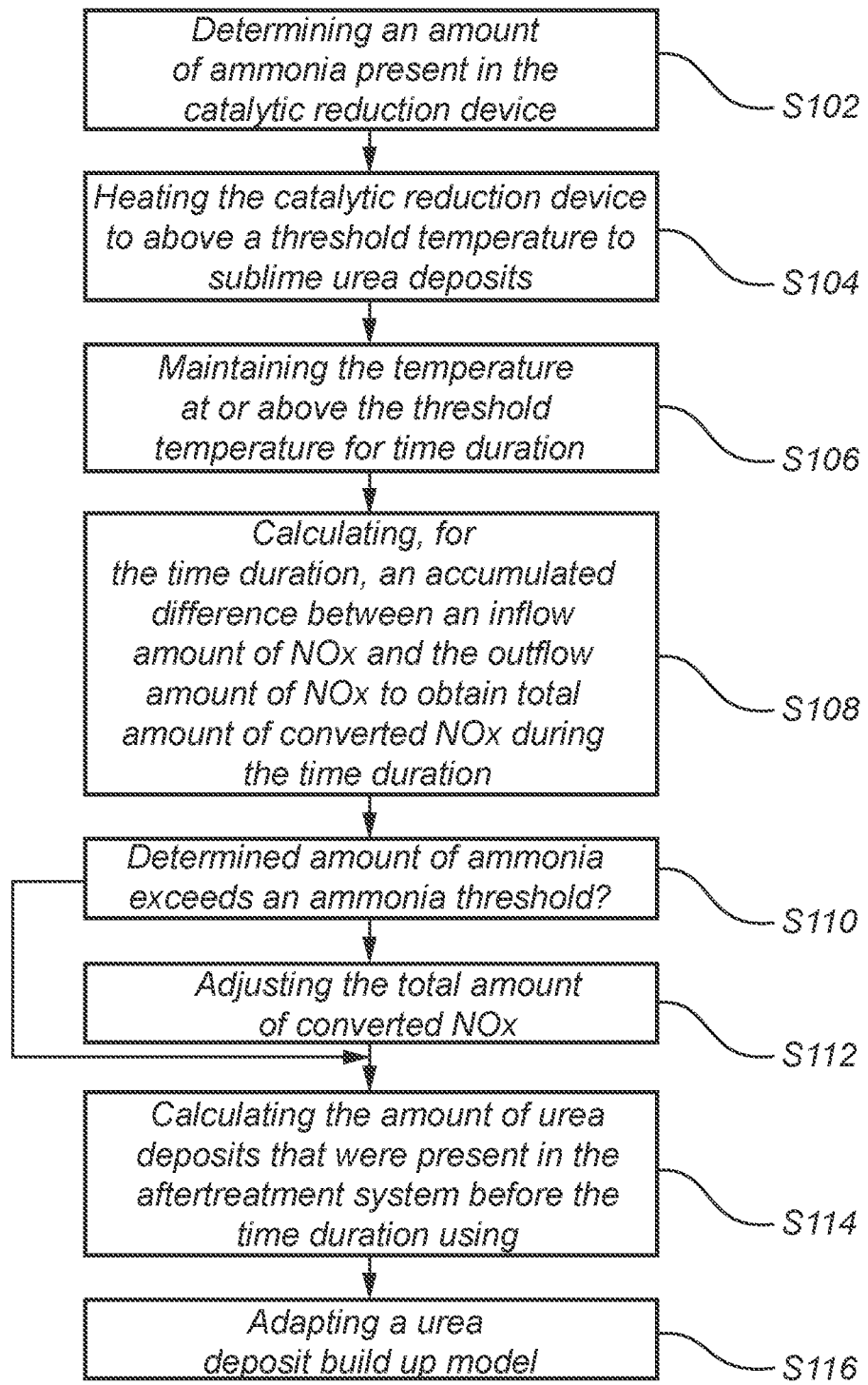
FIG. 2 is a flow-chart of method steps according to example embodiments of the invention.
Figure 3:
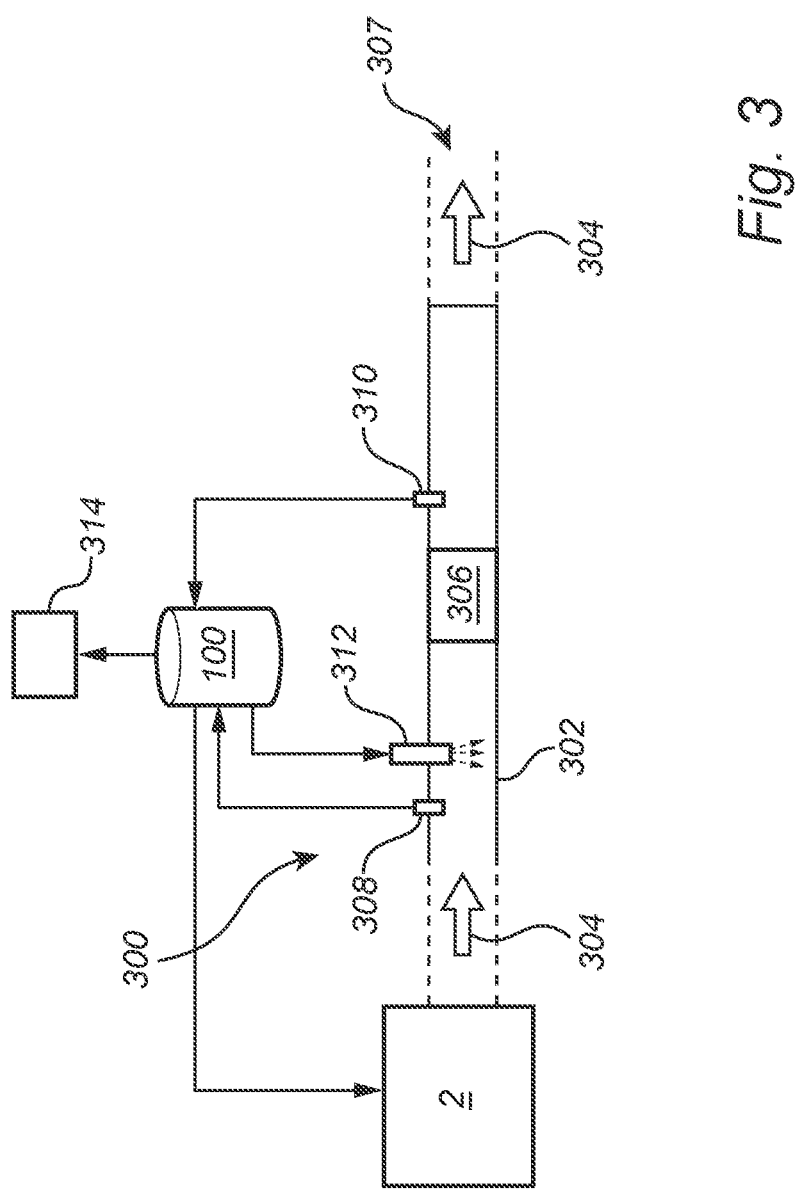
FIG. 3 is a schematic illustration of a system according to example embodiments of the invention.

FIG. 2 is a flow-chart of method steps according to embodiments of the invention and FIG. 3 conceptually illustrates an exhaust aftertreatment system 300 according to embodiments of the invention.

The exhaust aftertreatment system 300 comprises an exhaust pipe section 302 for transferring exhaust gas 304 towards an exhaust gas outlet 307. The exhaust pipe section 302 is part of a larger transfer system for transferring exhaust gas from the engine 2 to an exhaust gas outlet 307. The aftertreatment system 300 comprises a catalytic reduction device 306 e.g. a selective catalytic reduction device arranged in the exhaust gas flow for receiving exhaust gas 304. Further, the aftertreatment system 300 comprises a first NOx sensor 308 upstream of the catalytic reduction device 306 for measuring inflow levels of NOx to the catalytic reduction device 306, and a second NOx sensor 310 downstream of the catalytic reduction device 306 for measuring outflow levels of NOx from the catalytic reduction device 306. The inflow level of NOx is the amount of NOx that enters the catalytic reduction device 306. The outflow level of NOx is the amount of NOx that is left directly downstream of the catalytic reduction device 306. Although not explicitly denoted, the aftertreatment system 300 includes means for, that are controllable by the control unit 100, enabling heating the catalytic reduction device 306, for example, by performing a regeneration process, increasing vehicle engine load and speed by controlling the engine 2, and increasing a pressure across the catalytic reduction device 306 by controlling an outflow throttle of the catalytic reduction device 306.

Further, the aftertreatment system 300 comprises a urea injector 312 downstream of the first NOx sensor 308 and upstream of the catalytic reduction device 306 and that is configured to inject urea stored in a urea storage. Although not explicitly illustrated, the aftertreatment system 300 may comprise e.g., ammonia-slip catalysts, diesel oxidation catalyst, particulate filters, exhaust gas temperature sensors, and other components that are per se known to the skilled person and will not be described in detail herein. The locations of the NOx sensors in the aftertreatment system depend on the specific implementation at hand and various possibilities exist and are within the scope of the invention.

The method descried herein is for adapting a urea deposit build up model used for estimating an amount of urea deposits in an aftertreatment system of a vehicle comprising a catalytic reduction device. Such a urea deposit build up model is generally used in the vehicle for determining when to perform regeneration to remove urea deposits or reduce the risk of excessive urea deposit build up. In case the model incorrectly estimates that urea deposits have built up despite their not being any deposit build up, or the opposite, that the model estimates there not being any deposits despite the presence of deposits, an incorrect fault code may be generated in the vehicle control system that indicates the need for a workshop visit. During such workshop visit, the method described herein, provides for adapting the model according to a calculated amount of urea deposit build up according to method described herein.

A urea deposit build up models may take different forms and standard models for calculating or estimating urea deposit build up are available. Generally, a urea deposit build up model typically takes temperature, exhaust mass-flow and injected urea amount as input, and outputs accumulated urea deposits. Urea deposit build up models may be partly physical and partly empirical.

In step S102, determining, by the control unit 100, an amount of ammonia present in the catalytic reduction device 306. This step may be performed in various ways. For example, in a preferred embodiment, the control unit 100 controls means for heating the catalytic reduction device 306 to above a lower threshold temperature which is below a subliming temperature of urea deposits. This heating step is performed to substantially empty the catalytic device 306 from ammonia, whereby the determined amount of ammonia is negligible or substantially zero. The lower threshold temperature is about 250° C.

Figure 4:
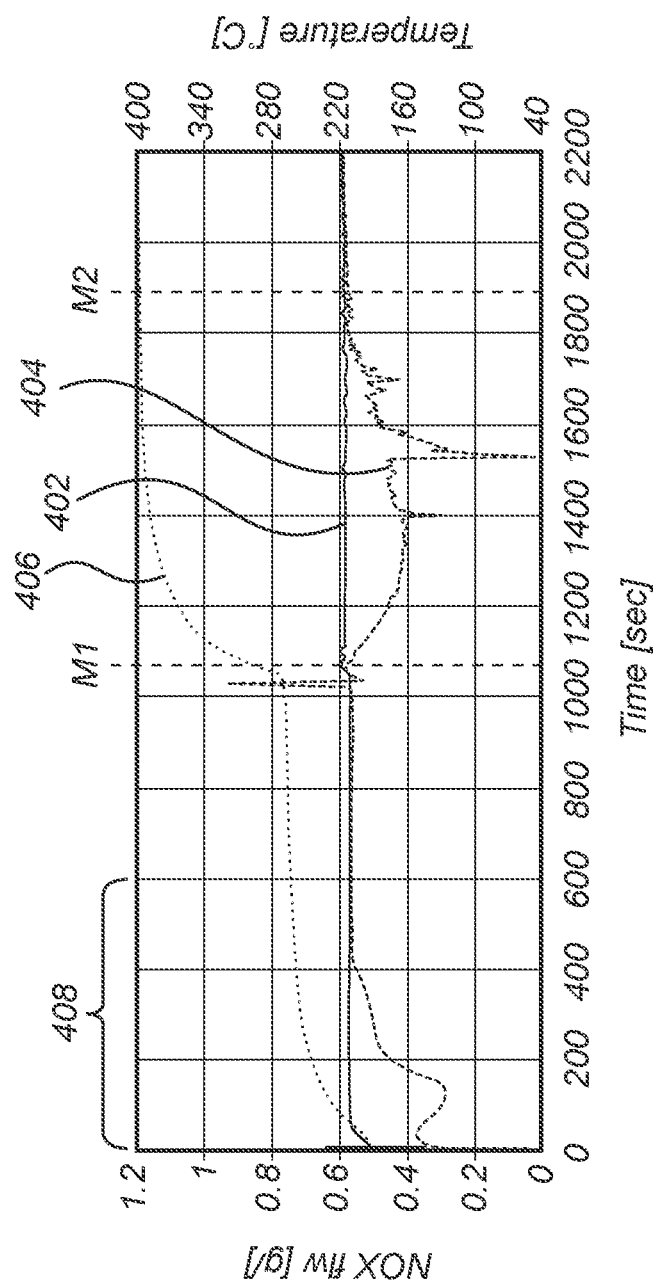
FIG. 4 is a graph showing inflow level of NOx, outflow level of NOx, and catalytic reduction device temperature versus time.

Turning to the graph in FIG. 4, where a first line 402 is the inflow level of NOx upstream of the catalytic reduction device 306 as measured by the first NOx sensor 308, a second line 404 is the outflow level of NOx downstream of the catalytic reduction device 306 as measured by the second NOx sensor 310, as a function of time. Further, the third line 406 is the temperature of the catalytic reduction device 306 as a function of time.

During a time period 408, the temperature of the catalytic reduction device 306 is controlled by the control unit 100 to be maintained at or above the lower threshold temperature of about 250° C. until the inflow level of NOx to the aftertreatment system 300 is substantially equal to an out-flow level of NOx from the aftertreatment system. In other words, at least at the end of the first time duration 408, the inflow level of NOx is substantially equal to an out-flow level of NOx as indicated by the overlapping lines 402 and 406 being at the same level of NOx at the end of period 408. When the inflow level of NOx is substantially equal to an out-flow level of NOx, no NOx conversion occurs in the catalytic reduction device 306 and the ammonia buffer in the catalytic reduction device 306 can be concluded to be empty. Thus, the determined level of ammonia is substantially zero. The period 408 may last longer than what is explicitly shown in FIG. 4, but with the target to reach at least that the inflow level of NOx is substantially equal to an out-flow level of NOx.

Alternatively, the control unit 100 may determine the amount of ammonia in the catalytic reduction device 306 by employing an ammonia buffer model for calculating the present amount of ammonia in the catalytic reduction device 306. Using this, the amount of ammonia in the catalytic reduction device 306 may be non-zero.

In step S104, the control unit 100 controls the means for heating to heat the catalytic reduction device 306 to above a threshold temperature to sublime urea deposits in the catalytic reduction device 306 to thereby produce ammonia that adds to the determined amount of ammonia. If the above steps for emptying the ammonia buffer is used, the determined amount of ammonia is considered zero or at least negligible. The threshold temperature to sublime urea deposits is about 350° C.

Turning again to FIG. 4, firstly the temperature of the catalytic reduction device 306 was raised to and maintained at or above about 250° C., but below a temperature for subliming urea deposits for time duration 408. At a time instant M1, the temperature of the catalytic reduction device 306 is raised to a temperature above the subliming temperature 350° C., in FIG. 4 exemplified by finally reaching 400° C. This causes the urea deposits in the catalytic reduction device 306 to sublime and release ammonia which causes the outflow of NOx to decrease since the released ammonia converts the inflow NOx. In other words, a deviation between inflow NOx and outflow NOx is present from M1 to a second time instant M2.

According to step S106, the temperature is maintained at or above the threshold temperature for a time duration until a measured amount of outflow of NOx, as measured by sensor 310 is stable. Once the outflow of NOx does not fluctuate it indicates that the NOx conversion has stopped, thus the added ammonia due to sublimed urea deposits has ceased. Preferably, the temperature is maintained at or above the threshold temperature until the measured amount of outflow of NOx is substantially equal to the inflow level of NOx, as is the case at time instant M2. Provided that no urea is added by e.g., injector 312, this indicates that all urea deposits has been sublimed since the NOx conversion has stopped.

Next, in step S108, the control unit 100 calculates, for the time duration for which the temperature is maintained at or above the threshold subliming temperature, an accumulated difference between an inflow amount of NOx and the outflow amount of NOx. In this way, the control unit 100 can obtain the total amount of converted NOx during the urea subliming time duration, from M1 to M2 in FIG. 4.

In step S112, if the determined amount of ammonia exceeds an ammonia threshold in step S110, adjusting the total amount of converted NOx according to the determined amount of ammonia and a predetermined relationship between converted NOx and used ammonia. In case the preferred steps are taken for ensuring that the ammonia buffer is empty, i.e., heating to above the lower threshold temperature for the time period 408, the determined amount of ammonia is considered zero and below the threshold and the process proceeds directly from step S110 to step S114.

However, in case the ammonia buffer model is used, and the determined level of ammonia is not zero, and above the threshold, some of the NOx conversion during the second time period at M1 is enabled by the ammonia present in the catalytic reduction device 306 and that is not released from the urea deposits. In this case, the total amount of converted NOx is adjusted by calculating the converted NOx caused by the ammonia present in the catalytic reduction device 306 using a predetermined formula or relationship between converted NOx and used ammonia. The adjustment is typically to reduce the amount of total converted NOx by the value determined by the determined amount of ammonia already present in the catalytic reduction device 306 and the predetermined formula or relationship between converted NOx and used ammonia.

Turning again to FIG. 4, where the strategy of emptying the ammonia buffer is used. The total amount of converted NOx is the difference between the accumulated amount of NOx from the curve 402 indicating the inflow of NOx for the time period between M1 and M2, and the accumulated amount of NOx from the curve 404 indicating the outflow of NOx for the time same period between M1 and M2. An accumulated amount may be considered e.g., the integral from time M1 to time M2, e.g., the area below the graphs 402 and 404.

In step S114, the control unit 100 calculates the amount of urea deposits that were present in the aftertreatment system before the subliming time duration, e.g., before or at time M1, using the calculated total amount of converted NOx, a predetermined relationship between converted NOx and used ammonia, and a predetermined relationship between the amount urea deposits and used ammonia.

The predetermined relationship between converted NOx and used ammonia may be for example empirically determined or determined from the chemical relationship between NOx and ammonia that describes the chemical reaction that occur during NOx conversion. Two example reactions are:

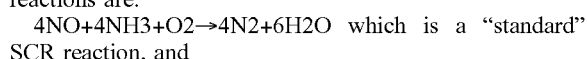

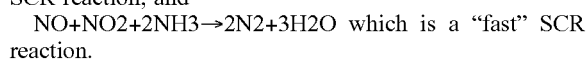

reaction.

Thus, in the most common reactions in selective catalytic reduction devices, the molar ratio is 1:1 for NOx and ammonia.

In a similar way, the predetermined relationship between the amount urea deposits and used ammonia may be empirically pre-determined by experimentally establishing a relationship between urea deposits needed for releasing an amount of ammonia. Alternatively, the predetermined relationship between the amount urea deposits and used ammonia may be predetermined from the chemical relationship between urea deposits and the amount of stored ammonia that is released once the urea deposits are sublimed.

Urea deposits contains mostly cyanuric acid and the molar ratio between ammonia and cyanuric acid is 3:1.

In step S116, the control unit 100 adapts a urea deposit build up model so that an output value of the urea deposit build up model more closely corresponds to the calculated amount of urea deposits. For example, a ratio between the calculated amount of urea deposits and the value determined by the urea build up model provides a measure of the models correspondence with the actual amount of urea deposits. This may be used to adjust or recalibrate the urea build up model according to the calculated actual amount or urea deposit.

The control unit 100 is configured to store the adapted urea deposit build up model in the memory storage device 314. The control unit is configured to retrieve and apply the adapted urea deposit build up model for estimating urea deposit build up during operation of the vehicle 1.

The control unit 100 is configured to receive a trigger signal for initiating the steps for adapting the urea deposit build up model. The trigger signal being caused by a controller external to the vehicle, for example a controller at a workshop and operated by workshop personnel via a user interface. Thus, the method is preferably performed at standstill of the vehicle and in a controlled environment.

If needed, urea or ammonia may be injected while heating the catalytic reduction device to above the threshold temperature for subliming urea deposits, i.e. during the time period between M1 and M2 in FIG. 2. In such case, a closed loop feedback control is used so that all the injected ammonia is used for NOx conversion. In other words, it is made sure that the outflow NOx level after M1 is near zero, and the amount of needed ammonia for maintaining the outflow NOx level at zero is kept track of.

The amount of ammonia transferred from sublimed urea deposits is then calculated as the difference between the total ammonia needed for total conversion of NOx and the injected amount of ammonia. Consequently, the amount of urea deposits is calculated using the calculated amount of ammonia transferred from sublimed urea deposits and the predetermined relationship between the amount urea deposits and used ammonia.

The method described herein is preferably performed when the vehicle is not travelling, however it is envisaged that the method may be executed also during vehicle operation.

The control of the aftertreatment system and means thereof for executing the method described herein may be performed by a control unit onboard the vehicle or by a control unit external to the vehicle.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrency. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for adapting a urea deposit build up model used for estimating an amount of urea deposits in an aftertreatment system of a vehicle comprising a catalytic reduction device, the method comprising the steps of:

determining an amount of ammonia present in the catalytic reduction device;

heating the catalytic reduction device to above a threshold temperature to sublime urea deposits in the catalytic reduction device to thereby produce ammonia that adds to the determined amount of ammonia;

maintaining the temperature at or above the threshold temperature for time duration until a measured amount of outflow of nitrogen oxides (NOx) is stable thereby indicating that the NOx conversion has stopped;

calculating, for the time duration, an accumulated difference between an inflow amount of NOx and the outflow amount of NOx to obtain total amount of converted NOx during the time duration;

if the determined amount of ammonia exceeds an ammonia threshold, adjusting the total amount of converted NOx according to the determined amount of ammonia and a predetermined relationship between converted NOx and used ammonia;

calculating the amount of urea deposits that were present in the aftertreatment system before the time duration using the calculated total amount of converted NOx, the predetermined relationship between the converted NOx and the used ammonia, and a predetermined relationship between the amount urea deposits and the used ammonia;

adapting a urea deposit build up model so that an output value of the urea deposit build up model corresponds to the calculated amount of urea deposits; and storing the adapted urea deposit build up model in a memory storage device.

2. The method according to claim 1, wherein the step of determining the amount of ammonia comprises:

heating the catalytic reduction device to above a lower threshold temperature below a subliming temperature of urea deposits to substantially empty the catalytic device from ammonia, whereby the determined amount of ammonia is below the ammonia threshold.

3. The method according to claim 2, comprising:

maintaining the temperature at or above the lower threshold temperature for a time period until the inflow level of NOx to the aftertreatment system is equal to an out-flow level of NOx from the aftertreatment system.

4. The method according to claim 2, wherein the lower threshold temperature is about 250° C.

5. The method according to claim 1, wherein the step of determining the amount of ammonia comprises:

using an ammonia buffer model for calculating the present amount of ammonia in the catalytic reduction device.

6. The method according to claim 1, comprising:

injecting ammonia to the catalytic reduction device while heating the catalytic reduction device to above the threshold temperature for subliming urea deposits, using closed loop feedback control so that all the injected ammonia is used for NOx conversion, and, calculating the amount of ammonia transferred from sublimed urea deposits as the difference between the total ammonia needed for total conversion of NOx and the injected amount of ammonia, wherein the amount of urea deposits is calculated using the calculated amount of ammonia transferred from sublimed urea deposits and the predetermined relationship between the amount urea deposits and the used ammonia.

7. The method according to claim 1, wherein the threshold temperature to sublime urea deposits is about 350° C.

8. An exhaust aftertreatment system of a vehicle comprising:

a catalytic reduction device;

a first NOx sensor upstream of the catalytic reduction device for measuring inflow levels of NOx, and a second NOx sensor downstream of the catalytic reduction device for measuring outflow levels of NOx;

means for heating the catalytic reduction device;

a memory storage device, and a control unit configured to:

determine an amount of ammonia present in the catalytic reduction device;

control the means to heat the catalytic reduction device to above a threshold temperature to sublime urea deposits in the catalytic reduction device to thereby produce ammonia that adds to the determined amount of ammonia;

control the means to maintaining the temperature at or above the threshold temperature for time duration until a measured amount of outflow amount of NOx is stable thereby indicating that the NOx conversion has stopped;

calculate, for the time duration, an accumulated difference between an inflow amount of NOx measured by the first NOx sensor and the outflow amount of NOx measured by the second NOx sensor to obtain total amount of converted NOx during the time duration;

if the determined amount of ammonia exceeds an ammonia threshold, adjust the total converted NoX according to the determined amount of ammonia and a predetermined relationship between converted NOx and used ammonia;

calculate the amount of urea deposits that were present in the aftertreatment system before the time duration using the calculated total amount of converted NOx, the predetermined relationship between the converted NOx and the used ammonia, and a predetermined relationship between the amount urea deposits and the used ammonia;

adapt a urea deposit build up model so that an output value of the urea deposit build up model corresponds to the calculated amount of urea deposits; and store the adapted urea deposit build up model in the memory storage device.

9. The exhaust aftertreatment system according to claim 8, wherein the control unit is configured to:

apply the adapted urea deposit build up model for estimating urea deposit build up during operation of the vehicle.

10. The exhaust aftertreatment system according to claim 8, wherein the control the means to heat includes at least one of: performing a regeneration process, increasing vehicle engine load, increasing engine speed, and increasing a pressure across the catalytic reduction device.

11. The exhaust aftertreatment system according to claim 8, wherein the control unit is configured to receive a trigger signal for initiating the steps for adapting the urea deposit build up model, the trigger signal being caused by a controller external to the vehicle.

12. A vehicle comprising an exhaust aftertreatment system according to claim 8.

13. A non-transitory computer readable medium carrying a computer program comprising program code for performing the steps claim 1 when said program code is run on a computer.

14. A control unit for adapting a urea deposit build up model used for estimating an amount of urea deposits in an aftertreatment system of a vehicle comprising a catalytic reduction device, the control unit being configured to perform the steps of the method according to claim 1.

\* \* \* \* \*